March 9, 1965 C. J. DANIELS ET AL 3,172,504
PROGRAMMED ARREST GEAR TAPE
Original Filed March 5, 1962 4 Sheets-Sheet 1

INVENTORS
Charles J. Daniels &
Donald B. Doolittle

BY *Herbert M. Birch*

ATTORNEY

March 9, 1965 C. J. DANIELS ET AL 3,172,504
PROGRAMMED ARREST GEAR TAPE
Original Filed March 5, 1962 4 Sheets-Sheet 2

INVENTORS
Charles J. Daniels &
Donald B. Doolittle

BY *Herbert M. Birch*

ATTORNEY

March 9, 1965   C. J. DANIELS ET AL   3,172,504
PROGRAMMED ARREST GEAR TAPE
Original Filed March 5, 1962   4 Sheets-Sheet 3

INVENTORS
Charles J. Daniels &
Donald B. Doolittle

BY *Herbert M. Birch*
ATTORNEY

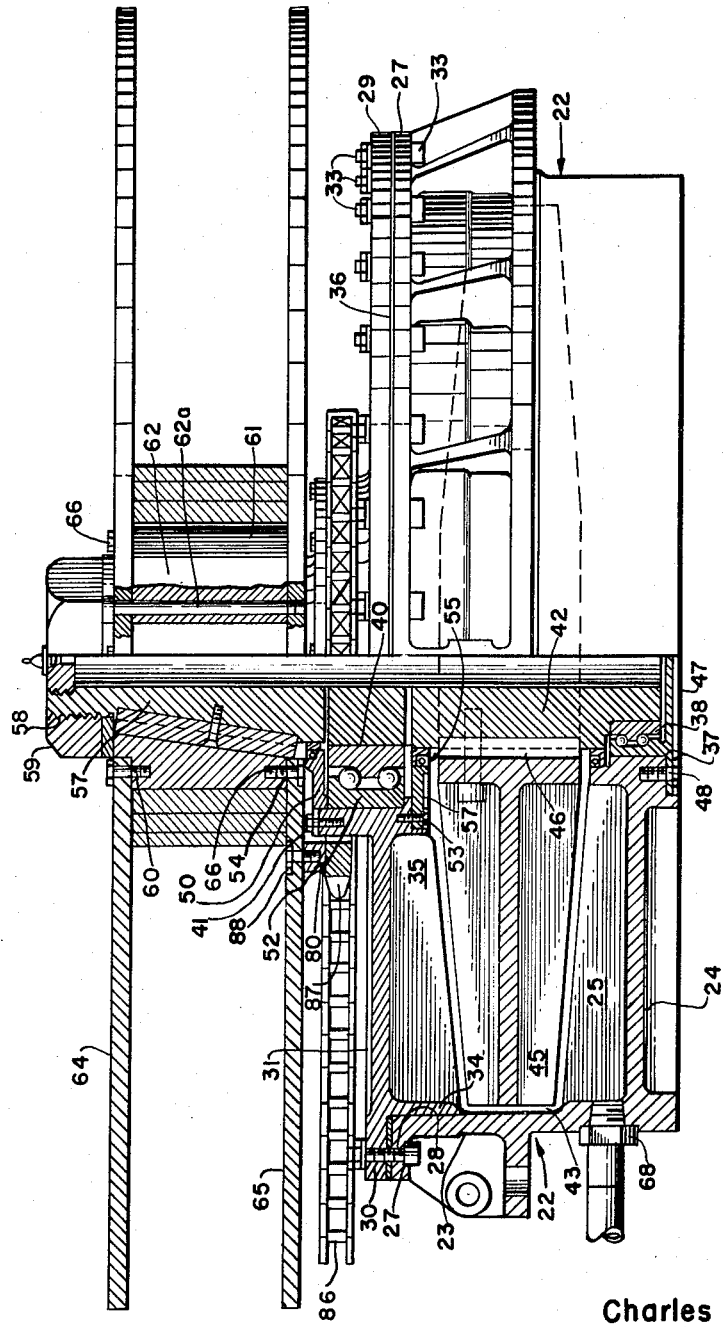

United States Patent Office 3,172,504
Patented Mar. 9, 1965

3,172,504
PROGRAMMED ARREST GEAR TAPE
Charles J. Daniels, Wilmington, and Donald B. Doolittle, Hockessin, Del., assignors to All American Engineering Company, Wilmington, Del., a corporation of Delaware
Continuation of application Ser. No. 177,493, Mar. 5, 1962. This application July 10, 1964, Ser. No. 381,873
4 Claims. (Cl. 188—90)

This application is a continuation of prior co-pending application Serial Number 177,493, filed March 5, 1962, for an Arresting Gear and Retrieve System, assigned by the inventor Donald B. Doolittle to the present assignee.

The present application is actually divided out of the foregoing identified application and relates specifically to a tape arrangement or formation adapted for use with an energy absorber of the type described in said above-identified application, such tape arrangement and formation serving to program the torque and/or braking effect of the energy absorber devices of the system.

Also, a specific object of the invention is to provide programmed performance of the energy absorber by the thickness of the tape and the radius of the wrapped tape as it pays out from the core of the tape drum during operation.

The above and other objects and advantages of the present invention will appear more fully hereinafter from a consideration of the detailed description which follows, taken with the accompanying drawings wherein several features and embodiments thereof are illustrated. It is to be expressly understood, however, that the drawings are for the purpose of illustration only and are not intended as a definition of the limits of the invention.

In the drawings, wherein like reference characters refer to like parts throughout the several views:

FIGURE 8 is a partial cross sectional view of an embodiment of the energy absorber, illustrating the association and mountings for the several parts thereof;

Figure 1:
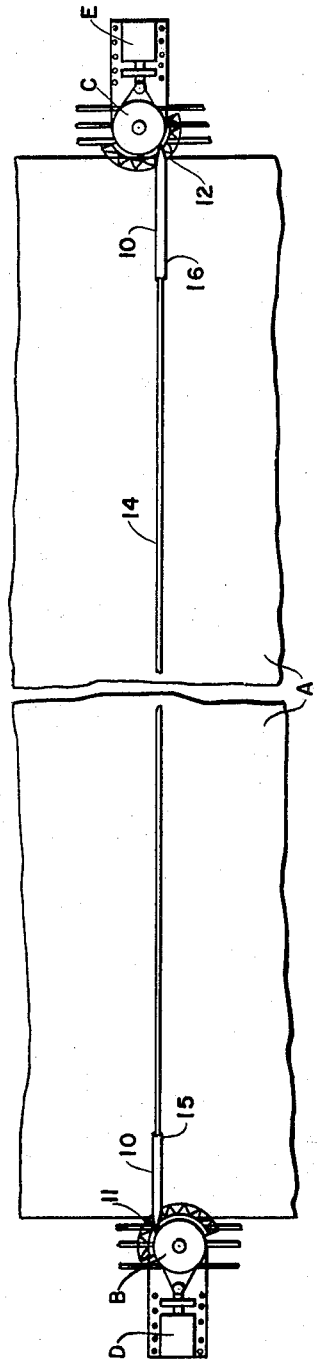
FIGURE 1 is a top plan view of the present invention installed adjacent each opposite edge of a landing surface, showing the energy absorbers with a partially extended tape, which tape ends are joined together at a predetermined tension by an aircraft arresting cable or deck pendant.
Figure 2:
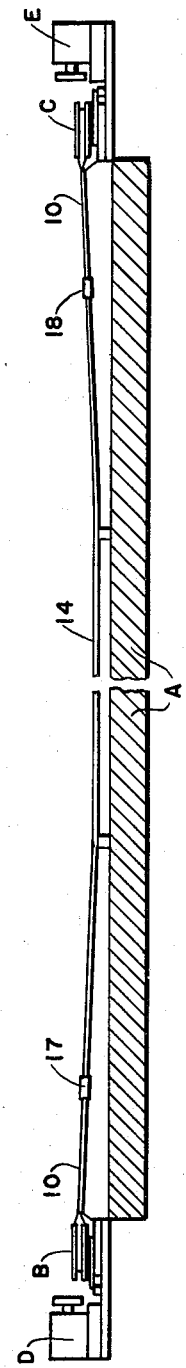
FIGURE 2 is a vertical cross section view of the landing surface of FIGURE 1 and a side elevation view of the arresting cable, tape connections and the energy absorbers of FIGURE 1.
Figure 3:
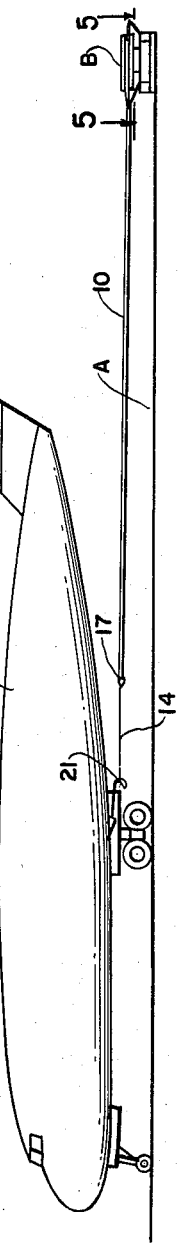
FIGURE 3 is a semi-schematic side view of an aircraft with its arrest hook engaged with the arrest cable or deck pendant and showing the tapes partially in payout position.
Figure 4:
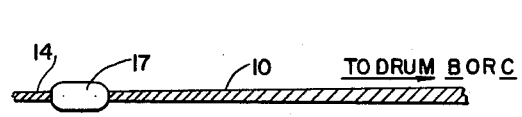
FIGURE 4 is a partial view of an arrest cable and a connecting tapered purchase tape of the present invention.

Referring to the drawings and first with particular reference to FIGURES 1 through 3 inclusive, there is shown a landing surface A having the present invention novel energy absorber means B and C with operatively associated retrieve means D and E respectively, mounted in slightly offset relation with respect to each other on opposite adjacent sides of the surface A. The offset relation is arranged to provide for a straightline payoff of the energy absorber tape 10, which as shown in FIGURE 4 is progressively varied in thickness from each unit at diametrically opposite tangential tape payout points 11 and 12, respectively. These oppositely positioned tangential payout points permit a substantially straight-line stretch or extension of the arrest cable 14 between the tape ends 15 and 16 of each respective absorber unit.

These tape ends which are reduced in thickness and the opposite ends of arrest cable are suitably coupled together by means, such as swivelled snap hooks 17 and 18 or the like. Also, the arrest cable, before each arrest, is supported by any well-known cable support means, such for example as in Patent Number 3,010,683 for Integral Cable Supports, owned by the present assignee of this invention, namely, All American Engineering Company of Wilmington, Delaware.

Since each energy absorber B and C of the first embodiment mounted on each side of the landing surface A is identical in construction to the other, except for the diametrically opposite tangential payout points shown in FIGURE 1, a description in detail of only one of said energy absorbers is necessary. Also, by using two absorbers on each side of a landing surface all crossover pulley means are eliminated and the deck pendant extends across the runway directly from each tape end.

The offset diametrically opposed tangential payout of the tape 10 from the tape storage drums of the units B and C provides for highly efficient bi-directional use to arrest an aircraft 20, such as shown in FIGURE 3, with the arrest hook 21 thereof engaged with the arrest cable 14.

Each energy absorber means is comprised of three basic component assemblies, namely; the energy absorber mechanism A or B, the tape retrieve and pretensioning mechanism D and E and the respective mounting bases and anchoring means therefor. These three component parts are hereinafter, described in detail under their respective headings.

*The energy absorber mechanism*

Figure 6:
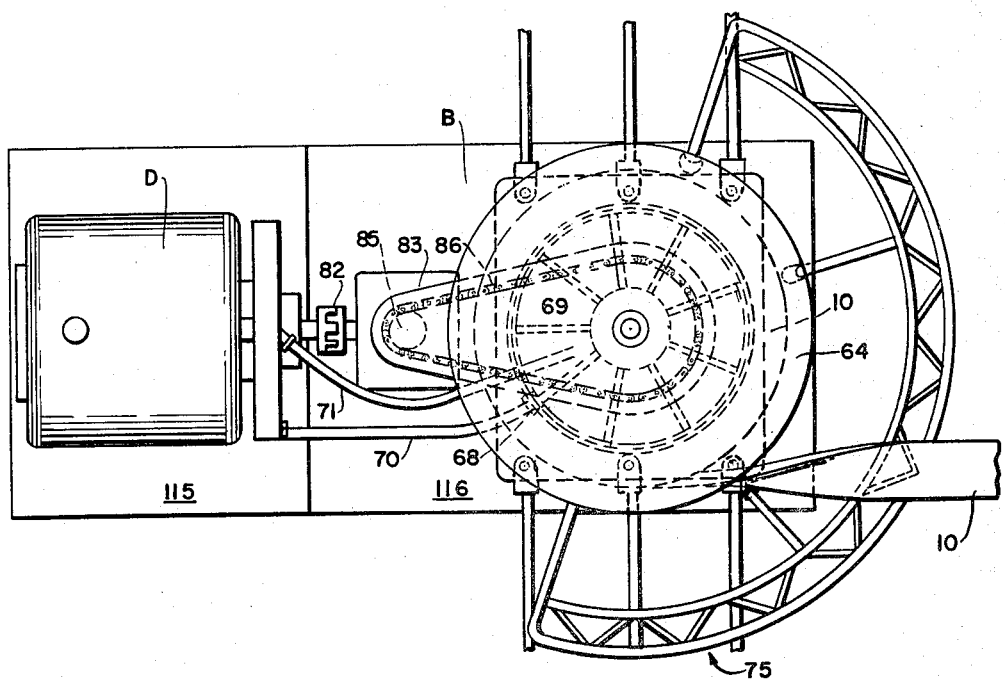
FIGURE 6 is a top plan view of one of the present invention energy absorbers, showing the rotor member in dotted lines as it is mounted in the fluid housing therefor, below the tape storage drum.
Figure 7:
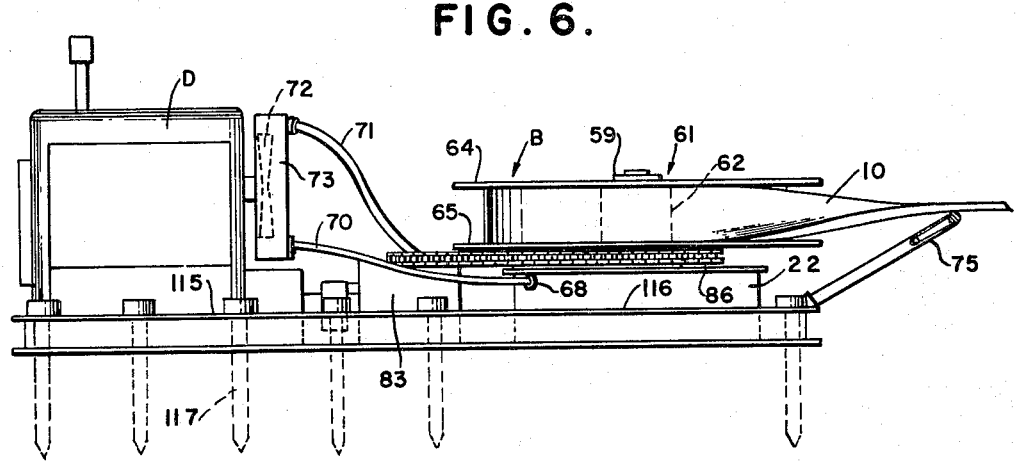
FIGURE 7 is a side elevation view of the energy absorber illustrated in FIGURE 4.

The energy absorber of embodiment one as illustrated in FIGURES 6 through 8 includes a housing 22. This housing is formed from a drum-shaped container 23, the bottom 24 of which container is formed with a plurality of radial upstanding stator blades 25, see FIGURE 8. The container 23 is formed around the top peripheral rim thereof with an outwardly projecting annular flange 27. The flange 27 is formed with fastener openings 28 for alignment with complementary fastener openings 30 in the annular flange 29 of an annular cover plate 31 for suitable fasteners 33. The cover plate 31 has an annular skirt 34 depending from the flange 29 at right-angles and forms the peripheral base of triangular or inwardly tapered stator blades 35 formed from the underside of the cover plate.

When the cover plate is in position with the opposed flange surfaces engaged, the outer circumferential surface of the cover plate skirt 34 frictionally fits against the inner top surface of the container below the flange. Said flange serves as a guide and as a reinforcing ring for the stator blades 35. To further seal the cover plate in fluid tight connection, an annular gasket 36 is clamped between the flanges 27 and 29.

The bottom 24 of the container is concentrically formed with a bore 37 to provide a bearing mount opening to mount a lower bearing assembly 38. The plate cover is also concentrically formed with a bore 40 to provide a bearing mount opening for an upper bearing assembly 41 to rotatably support the main shaft 42 and a keyed or splined rotor 43 with matching tapered rotor blades 44 and 45 formed from each respective face of the rotor. The rotor is keyed to the main shaft by key means 46.

The rotor blades 44 and 45 extend between the top and bottom stator blades 25 and 35. Each adjacent rotor blade is oppositely tapered with respect to its next adjacent matching tapered stator blade and the respective edges of each opposite rotor and stator blade are slightly spaced apart to permit free rotation of the rotor between the fixed stator blades. There are an uneven number of rotor blades with respect to the number of said stator blades, whereby the beat effect is thereby minimized. For example, there may be a group of eight stator blades opposite to a group of nine rotor blades, or vice versa.

The lower bearing 38 is sealed by a lower plate 47 and an upper oil seal 48 in the bore 37. This bearing seal plate 47 is secured to the container bottom plate 24 by bolts 48. The upper bearing 41 is supported between upper and lower plates 50 and 51, respectively, which are secured by bolts 52 and 53 on the cover plate 31. These plates are formed with aligned openings sealed around the shaft 42 by superimposed upper and lower oil seals 54 and 55.

The main rotor shaft 42 extends through the container 24 in the bearing mountings and then is formed with a conical extended hub 57. The tip of the end of hub 57 is formed with exterior threads 58 for threadedly receiving a retainer nut 59. Keyed onto the hub 57 by key members 60 is a tape storage drum 61, see FIGURE 5.

The tape reel or storage drum has an end of the tape 10 anchored to it by a bolted supplementary core means adjacent a flat side surface of the tape storage drum, around which supplementary core means the tape 10 is looped and secured by staples or stitches 63. Thus the tapered arresting tape 10 is anchored to the said core means 62 of the tape reel or storage drum so that withdrawal by unwinding of tape from around the core of the drum causes the main shaft and the rotor to revolve.

Figure 5:
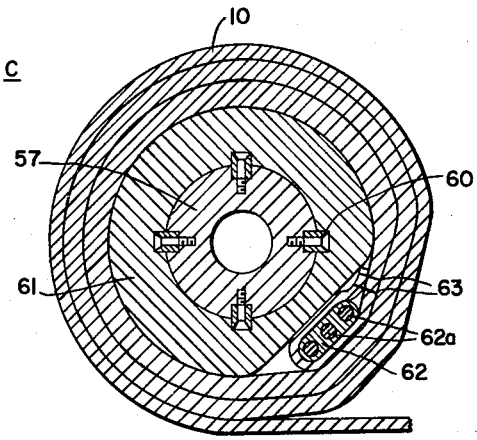
FIGURE 5 is a cross section view taken on a section line 5—5 of FIGURE 3.

The tape is readily replaceable by withdrawal of bolt means 62a, whereby various tape designs may be used to control payout operation and for worn tape replacement, see FIGURE 5.

The tape reel or storage drum 61 comprises the said core means 62 and spaced disk members 64 and 65 secured to the top and bottom ends of the said drum 61 by threaded fastener 66. These plates of the tape drum may be made of aluminum to provide for lighter weight and to facilitate replacement or interchange and transport of the tape drums from the main rotor shaft 42. For example, to control various conditions of arrest operation the tape 10 may be programmed, by shaping or by progressively varying its thickness and pay off radius, to thereby control the velocity of payout of the tape when pulled by the arrest hook engaged arrest cable of landing aircraft and to thereby maintain a constant torque from the rotor, see FIGURE 8.

The housing 22 of the energy absorber unit is maintained filled with energy absorbing fluid. This fluid may be varied, for example, various high or low temperature, high or low density fluid may be used as predetermined to vary the capabilities of the unit.

When repeated rapid cycling operations are required, the unit may be coupled by coupling connections 68 and 69, see FIGURES 4, 5 and 6, with conduits 70 and 71, which connect to a fluid circulating pump 72. This pump 72 may be driven by the retrieve engine D and the fluid is recirculated through the arresting unit or energy absorber and the heat exchanger 73 associated with the pump 72.

In FIGURES 6 and 7, there is shown a tape turning bar 75. This bar is secured to the supporting base for the energy absorber unit housing and extends around the circumference of the tape payout quadrant a short distance from the tape drum perimeter to lift the tape during retrieve operations. This lifting action facilitates winding or rewinding of the tape 10 on the storage reel or drum during retrieving after an arrest of an aircraft and centers the tape on the core 62 to thereby prevent loading the bottom plate 65 of the drum and prevents tape slump on the drum.

*Tape retrieving and pretensioning mechanism*

Following each arrestment operation of the energy absorber members, the tape must be rewound onto the tape drum 61. This retrieving operation may be manual or by a power driven retrieving mechanism; such as generally referenced by the letters D and E, see FIGURES 1, 2, 6 and 7. The retrieve mechanism may comprise any suitable power means, such as a gasoline engine D with a drive shaft 81 with a clutch means 82. This clutch drive connects to a gear reduction unit 83 from which vertically extends a power takeoff shaft 84 and sprocket wheel 85, see FIGURE 4.

The sprocket wheel 85 has reeved around the same a drive chain 86, which goes to and around a relatively large sprocket wheel 87 secured by means, such as bolts 88 and a spacer ring 80 formed around a face of the wheel 87, to the underside of the tape drum disk 65, see FIGURES 6, 7 and 8.

Figure 11:
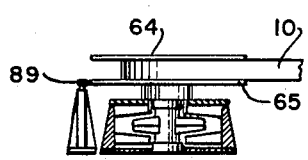
FIGURE 11 is a cross section view of the energy absorber including an elevation view of a friction brake means for pretensioning the tape and arrest cables.

The engine D serves the dual function of retrieving and pretensioning. For example, the engine D is provided with suitable starting and reversing means, not shown, and the engine is preferably manually declutched from the gear reduction unit during an arrest. The pretensioning arrangement provides suitable brake means such as a friction brake 89, see FIGURE 11, for maintaining a predetermined load on the arrest cable or deck pendant 14 prior to an arrest. This pretensioning or loading of the arrest cable 14 prevents the whip-lash action of a slack cable from damaging aircraft passing over the same and materially improves the cable dynamics. The pretension brake mechanism may be released manually or automatically at a predetermined load. The pretension mechanism may be devised to automatically reset itself or be manually controlled during the retrieve operation and the same may be manually adjusted to provide for its predetermined release, however, the details of such mechanism is to be described and claimed in detail in a subsequently filed patent application.

*Mounting bases and anchoring means*

The energy absorber units and the retrieve mechanisms are supported on flat base members, such as mounting pallets 115 and 116, respectively, see FIGURES 6 and 7. These mounting pallets may be ground anchored by suitable means, such as elongated spikes 117 and in some instances may be molded into cement binding material poured into holes around the spike shanks.

*Embodiment two*

Figure 9:
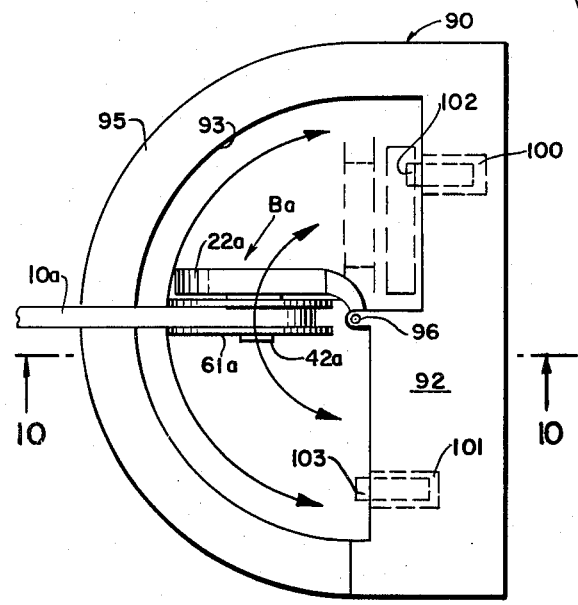
FIGURE 9 is a top plan view of another form of the energy absorbers using the novel tapered tape of the present invention.
Figure 10:
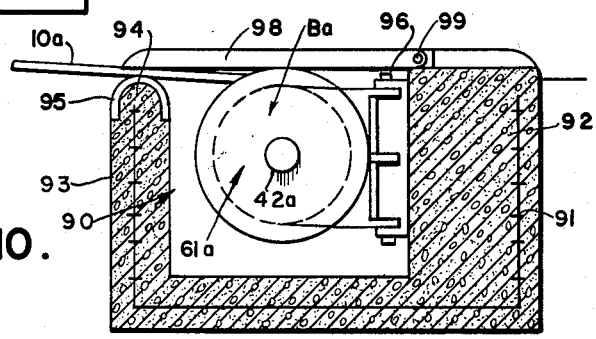
FIGURE 10 is a cross section view taken along section line 10—10 of FIGURE 9.

FIGURES 9 and 10 illustrate a second embodiment of the energy absorber and illustrate an installation positioned flush with a suitable landing surface. In this flush mounting arrangement, the energy absorber means is mounted in a concrete box 90 open at the top formed with a metal grid reinforcement 91 embedded therein. The box 90 is sector-shaped and comprises a solid rear wall 92 joined at each end to the ends of an arcuate front wall 93. The top peripheral edge 94 of the arcuate front wall is rounded and covered with a rub block 95 over which passes the progressively tapered tape 10a as it reeves off of the reel associated with energy absorber unit Ba.

This unit Ba has a companion energy absorber as in embodiment one, and is pivoted on a vertical hinge structure 96, whereby the casing 22ª thereof swings in a horizontal arcuate path about the hinge in response to directional loads on the tape. Thus the absorber unit 22ª is swiveled, so that the progressively tapered tape follows the direction of payout.

The box 90 is provided with a cover 98 pivoted by the hinge 99 at the top of the straight rear wall 92 of the box, and this cover will support aircraft loads in the event an aircraft wheel or the like passes over the same.

The rear wall 92 of the box 90 is formed with depressions or sockets 100 and 101 to mount suitable shock absorbers 102 and 103. These shock absorbers serve to prevent damage to the absorber unit, if excessive swivel action is encountered during an arrest. The energy absorber unit Bª is identical to the unit of embodiment one, and includes the same tape drum 61ª and the same rotor mechanism 43 keyed with a rotor shaft 42ª.

*Operation*

From the foregoing the operation of the energy absorber is believed obvious. For example, briefly summarizing a normal operation, as the arrest cable or deck pendant 14 is engaged by the hook equipped aircraft as shown in FIGURE 3, the progressively tapered arresting tape 10 is pulled from the tape storage drum 61 and the aircraft is decelerated by the action of the rotor housed in container 22.

This tapered tape, which is preferably nylon tape, as it unwinds revolves the rotor 43 with respect to the stator blades 25 and 35 on each side of the rotor blades 44 and 45 in the container 22 according to the radius arm of the tape as it unwinds. As this occurs fluid flow within the container is primarily in an outward direction from the center drive shaft toward the peripheral edge of the rotor blades, and, after turning 180 degrees near the outside diametrical edge thereof, flows back toward the hub or drive shaft 42 between the stator blades 25 and 35. This flow, along with turbulence within the flow pattern, develop torque at the shaft 42 which is transmitted to the tape drum 61.

It is possible to predict the performance curves of the energy absorber unit; namely, for example, tension-payout and aircraft hook-load and runout curves for different size energy absorber units. These performance curves may be developed from:

(1) The torque developed by the rotor.
(2) The radius to the nylon tape 10 as it is wrapped on the drum 62.
(3) The thickness of the tape webbing or change in the radius of the webbing as it pays out.
(4) The tape may be tapered in transverse section or it may be programmed in stepped down sections, for example, at fifty (50) foot intervals.

By changing these parameters suitable performance characteristics can be positively obtained for various ranges of aircraft weights and engaging velocities using a given landing surface span and aircraft runout distance.

After the aircraft arresting hook 21 is disengaged from the arresting cable 14, the retrieve engine D is clutched in and the variably thick nylon arresting tape 10 is rewound on the storage drum 61 to make the same ready for another aircraft arrest operation. During the retrieving of the tape by rewinding the same on the drum 61 the turner bar 75 is mounted on the pallet member, but during each aircraft arrestment operation this turner bar 75 is removed.

The bi-directional ability of this arrest installation provides for rapid cycling and when rapid cycling is required, the cooling system including the heat exchanger 73, pump 72 and the coolant conveying conduits 70 and 71 are utilized during retrieving to prevent overheating of the fluid in the energy absorber units.

As briefly referred to hereinbefore, the fluid used can vary in density, for example, water in summer and an antifreeze solution, such as an ethylene glycol solution in winter.

Thus there is provided a simplified aircraft arresting gear which is very efficient in action and which action is positively predictable for the best results, when location, climate or temperature conditions and when aircraft weights, engaging velocities, thrust, arrest cable deck span and aircraft runout are known.

Without further description it is believed that the advantages of the present invention over the prior art is apparent and while only two embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. Means for arresting mobile objects having an object arrest cable and comprising an energy absorber having a rotatable fluid immersed rotor, a housing for holding fluid enclosing said rotor, a rotor shaft extending through said housing, said housing having a top and a bottom wall, said top and bottom walls having a predetermined number of oppositely facing stator blades, said rotor being formed with a predetermined number of oppositely facing rotor blades, said rotor shaft having a hub portion extending beyond the top wall of said housing, a tape storage drum keyed to said hub portion, and tape wrapped around said storage drum having a free end connectable with the arrest cable, said tape being pulled out according to the load resulting from the weight and velocity of a mobile object imparted to the free end of said tape as said object engages said arrest cable, said number of stator blades being different from the said number of rotor blades to minimize beat effect during operation, said tape being formed of varying thickness from its free end, thereby varying the radius of the wrapped tape on the storage drum.

2. An energy absorber unit comprising a liquid containing container and a drum, a tape wrapped upon itself in a single spiral around said drum, a rotary fluid brake means with radial vanes, said vanes being secured to a shaft with an extended hub portion exterior of the container, said drum being keyed to said hub, said tape during unwinding thereof from the drum thereby rotating said drum and the said vanes of the rotary brake means, whereby resistance of said vanes in the liquid in said container is imparted to said tape drum to resist the unwinding of said tape from the drum, said tape being formed into stepdown sections at longitudinally arranged programmed intervals.

3. An energy absorber unit comprising a liquid containing container and a drum, a tape wrapped upon itself in a single spiral around said drum, a rotary fluid brake means with radial vanes, said vanes being secured to a shaft with an extended hub portion exterior of the container, said drum being keyed to said hub, said tape during unwinding thereof from the drum thereby rotating said drum and the said vanes of the rotary brake means, whereby resistance of said vanes in the liquid in said container is imparted to said tape drum to resist the unwinding of said tape from the drum, said tape being tapered in transverse section at longitudinally arranged programmed intervals.

4. An energy absorber unit for decelerating a mobile load comprising a container with liquid therein, said container having top and bottom walls, stator blades projecting radially from the interior surface of each of said walls, a shaft rotatably journalled in the top and bottom walls of said container, said shaft having an end extending from within said container beyond the exterior surface of said top wall thereof, radial drag vanes on said shaft within said container adjacent said stator blades, a hub keyed on the extended end of said shaft, a drum keyed to said extended shaft end, a load engageable cable, a tape wrapped around said drum in coiled layers, said tape having a free end extending from the top coiled layer thereof for connection with said load engageable cable, said tape unwinding when said load engageable cable is moved by an engaging mobile load, said tape during unwinding reducing the radius of said coiled layers on the drum, thereby imparting a programmed rotation to the drum, said shaft and the radial vanes on the shaft, said vanes displacing liquid within the container with respect to said radially projecting stator blades, whereby said rotation of said drag vanes in the liquid provides a programmed drag resistance to the rotation of said shaft and said drum and resists the unwinding of said tape therefrom, said tape being made progressively thicker in cross-section, to thereby vary the radius of the tape wrap on the drum.

No references cited.

ARTHUR L. LA POINT, *Primary Examiner.*

EUGENE G. BOTZ, *Examiner.*